United States Patent
Simon et al.

(12)

(10) Patent No.: US 6,779,123 B2
(45) Date of Patent: Aug. 17, 2004

(54) CALIBRATING RETURN TIME FOR RESYNCHRONIZING DATA DEMODULATED FROM A MASTER SLAVE BUS

(75) Inventors: Thomas D. Simon, Marlborough, MA (US); Rajeevan Amirtharajah, Providence, RI (US)

(73) Assignee: Intel Corporation, Santa Clara, CA (US)

( * ) Notice: Subject to any disclaimer, the term of this patent is extended or adjusted under 35 U.S.C. 154(b) by 668 days.

(21) Appl. No.: 09/796,344

(22) Filed: Feb. 28, 2001

(65) Prior Publication Data

US 2002/0120880 A1 Aug. 29, 2002

(51) Int. Cl.[7] .................................................. G06F 1/12
(52) U.S. Cl. ........................ 713/400; 713/503; 370/519
(58) Field of Search ................................ 713/400, 503; 333/124; 370/519; 375/356

(56) References Cited

U.S. PATENT DOCUMENTS 6,029,250 A * 2/2000 Keeth .......................... 713/400
6,581,017 B2 * 6/2003 Zumkehr ..................... 702/107
6,643,787 B1 * 11/2003 Zerbe et al. ................. 713/400
6,665,624 B2 * 12/2003 Simon et al. .................. 702/89

OTHER PUBLICATIONS

Luca Satori and Bunnel G West, "The path to one–picosecond accuracy", IEEE, ITC International Test Conference, pp. 619–627, Oct. 2000.*

* cited by examiner

Primary Examiner—Dennis M. Butler
Assistant Examiner—Albert Wang
(74) Attorney, Agent, or Firm—Fish & Richardson P.C.

(57) ABSTRACT

Calibrating return time includes determining clock calibration information based on clock signals local to a master device and return clock signals corresponding to each of at least two slave devices, storing clock calibration information with respect to each of the slave devices with which the master device will communicate using a bus, and, after the clock calibration information has been stored, resynchronizing data signals that are received from each of the slave devices based on the corresponding stored clock calibration information.

13 Claims, 17 Drawing Sheets

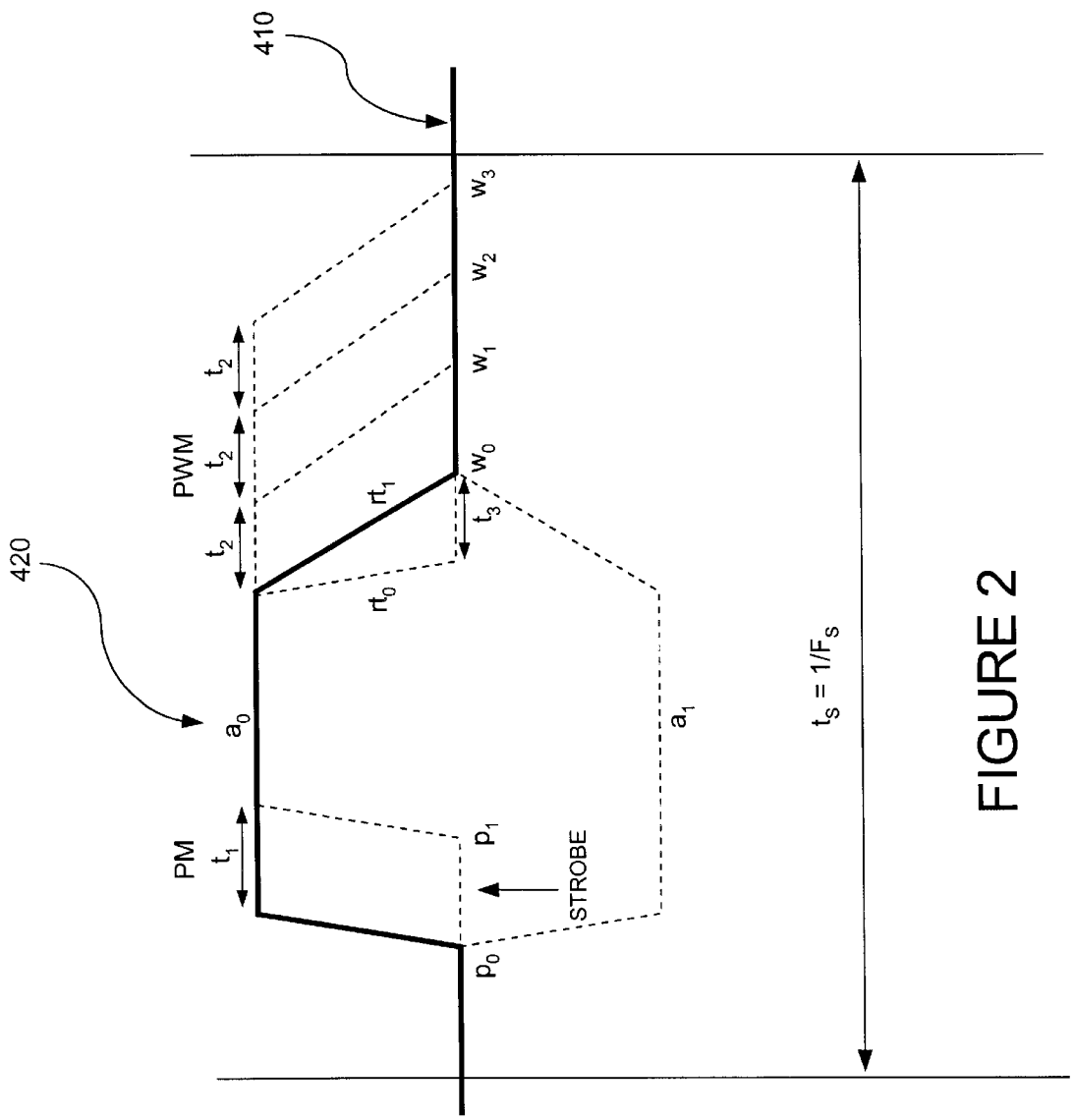

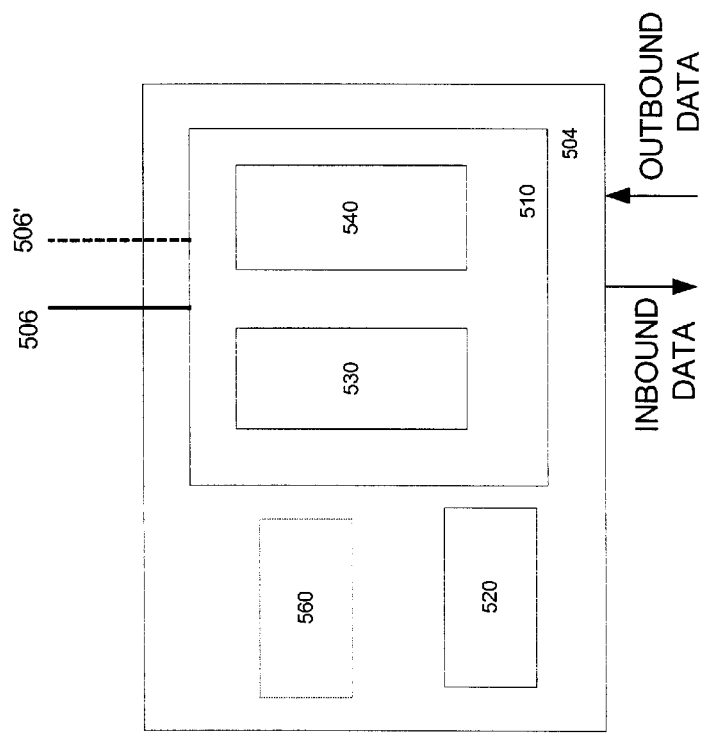
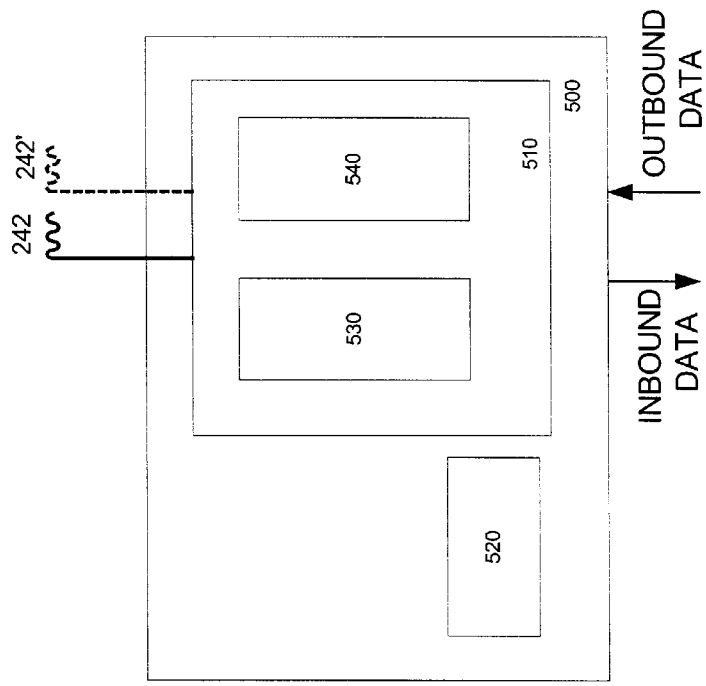
FIGURE 3B
FIGURE 3A

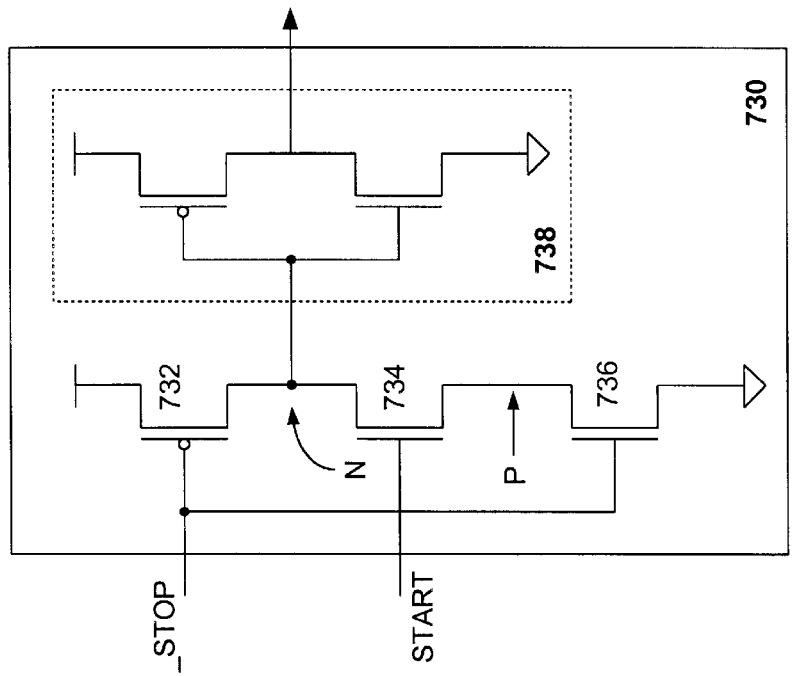
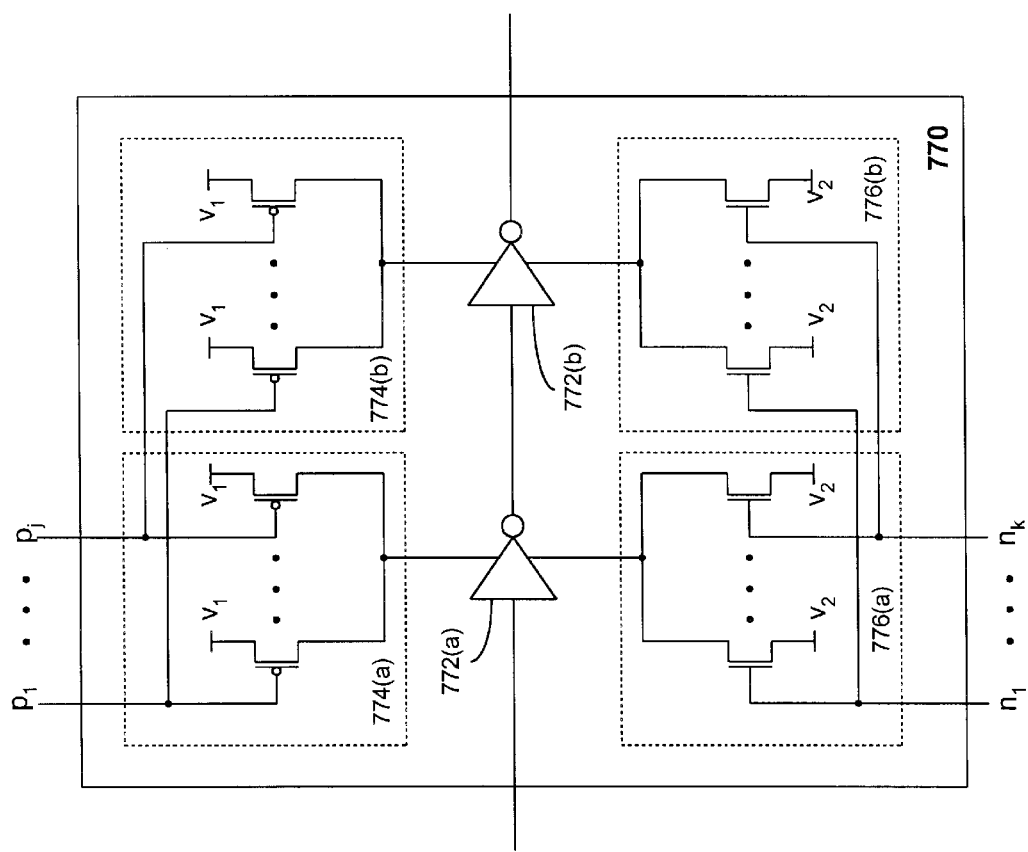
FIGURE 5C
FIGURE 5B

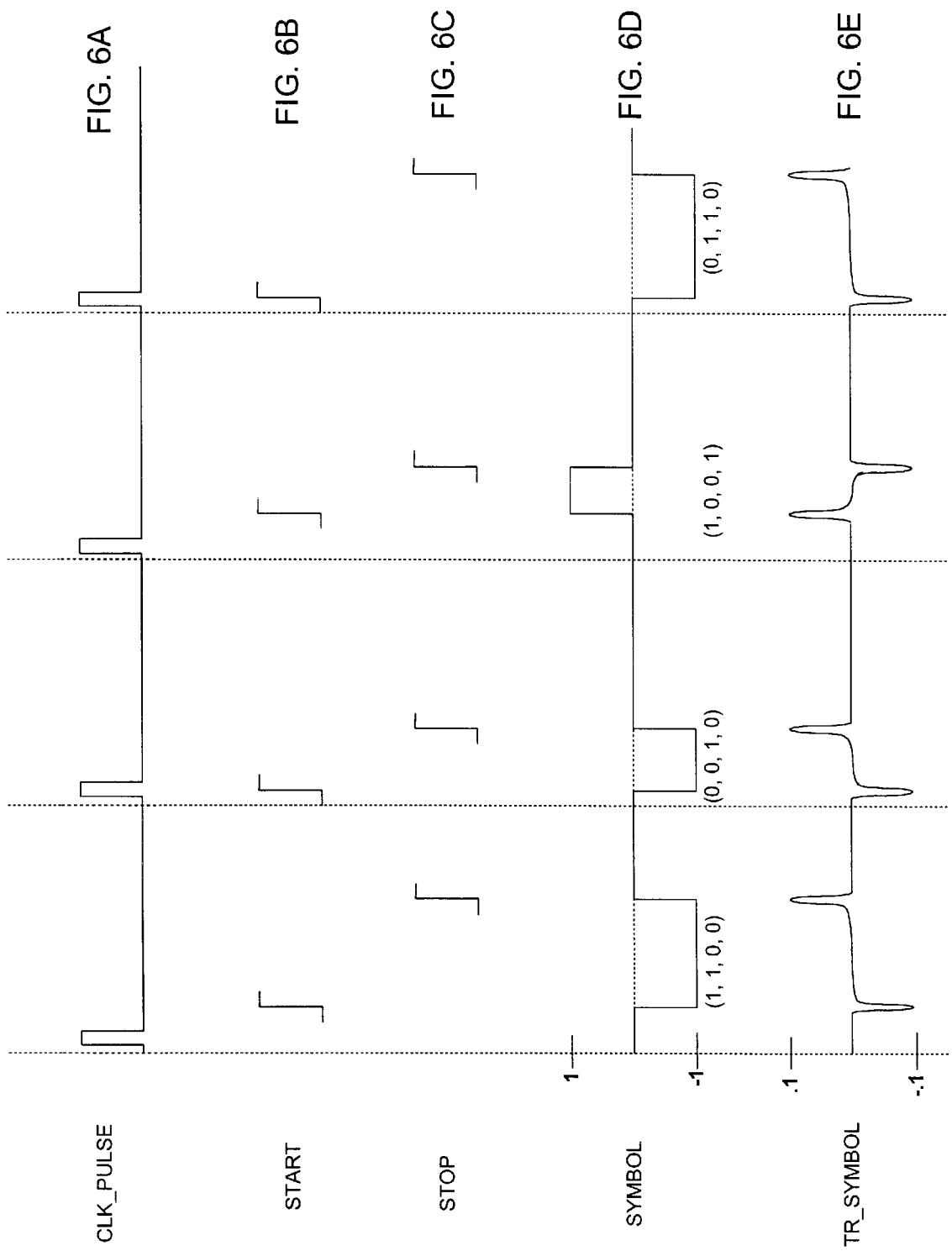

CALIBRATING RETURN TIME FOR RESYNCHRONIZING DATA DEMODULATED FROM A MASTER SLAVE BUS

BACKGROUND

This invention relates to calibrating return time.

Digital electronics systems, such as computers, must move data among their component devices at increasing rates to take full advantage of the higher speeds at which these component devices operate. For example, a computer may include one or more processors that operate at frequencies of a gigahertz (GHz) or more. The data throughput of these processors outstrips the data delivery bandwidth of conventional systems by significant margins.

The digital bandwidth (BW) of a communication channel may be represented as:

$$BW = F_s N_s$$

Here, $F_s$ is the frequency at which symbols are transmitted on a channel and $N_s$ is the number of bits transmitted per symbol per clock cycle ("symbol density"). Channel refers to a basic unit of communication, for example a board trace in single ended signaling or the two complementary traces in differential signaling.

Conventional strategies for improving BW have focused on increasing one or both of the parameters $F_s$ and $N_s$. However, these parameters cannot be increased without limit. For example, a bus trace behaves like a transmission line for frequencies at which the signal wavelength becomes comparable to the bus dimensions. In this high frequency regime, the electrical properties of the bus must be carefully managed. This is particularly true in standard multi-drop bus systems, which include three or more devices that are electrically connected to each bus trace through parallel stubs.

Practical BW limits are also created by interactions between the BW parameters, particularly at high frequencies. For example, the greater self-induced noise associated with high frequency signaling limits the reliability with which signals can be resolved. This limits the opportunity for employing higher symbol densities.

Modulation techniques have been employed in some digital systems to encode multiple bits in each transmitted symbol, thereby increasing $N_s$. Use of these techniques has been largely limited to point-to-point communication systems, particularly at high signaling frequencies. Because of their higher data densities, encoded symbols can be reliably resolved only in relatively low noise environments. Transmission line effects limit the use of modulation in high frequency communications, especially in multi-drop environments.

Information communicated over buses, like information communicated over other transmission lines, may experience delay with reference to a system clock or other timing mechanism.

DESCRIPTION OF DRAWINGS

The present invention may be understood with reference to the following drawings, in which like elements are indicated by like numbers. These drawings are provided to illustrate selected embodiments of the present invention and are not intended to limit the scope of the invention.

FIG. 2 is a schematic representation of a symbol that represents multiple bits of data.

FIGS. 3A and 3B are block diagrams of an interface that is suitable for use with the present invention.

FIGS. 5A–5D are circuit diagrams for various components of the transmitter of FIG. 4.

FIGS. 6A–6E represent signals at various stages of data transmission of the bus system of FIG. 1.

DESCRIPTION

A mechanism for calibrating return time is described here in the context of a high bandwidth communication technique that provides greater control over the frequency and encoding mechanisms employed to transfer data.

In one aspect of the invention, clock calibration information is stored with respect to each of at least two slave devices with which a master device will communicate using a bus, the clock calibration information being based on clock signals local to the master device and return clock signals corresponding to each of the slave devices. After the clock calibration information has been stored, data signals that are received from each of the slave devices are resynchronized based on the corresponding stored clock calibration information.

Before proceeding to a discussion of the calibration technique, we describe an example of the circuitry to which it may be applied.

Figure 1:
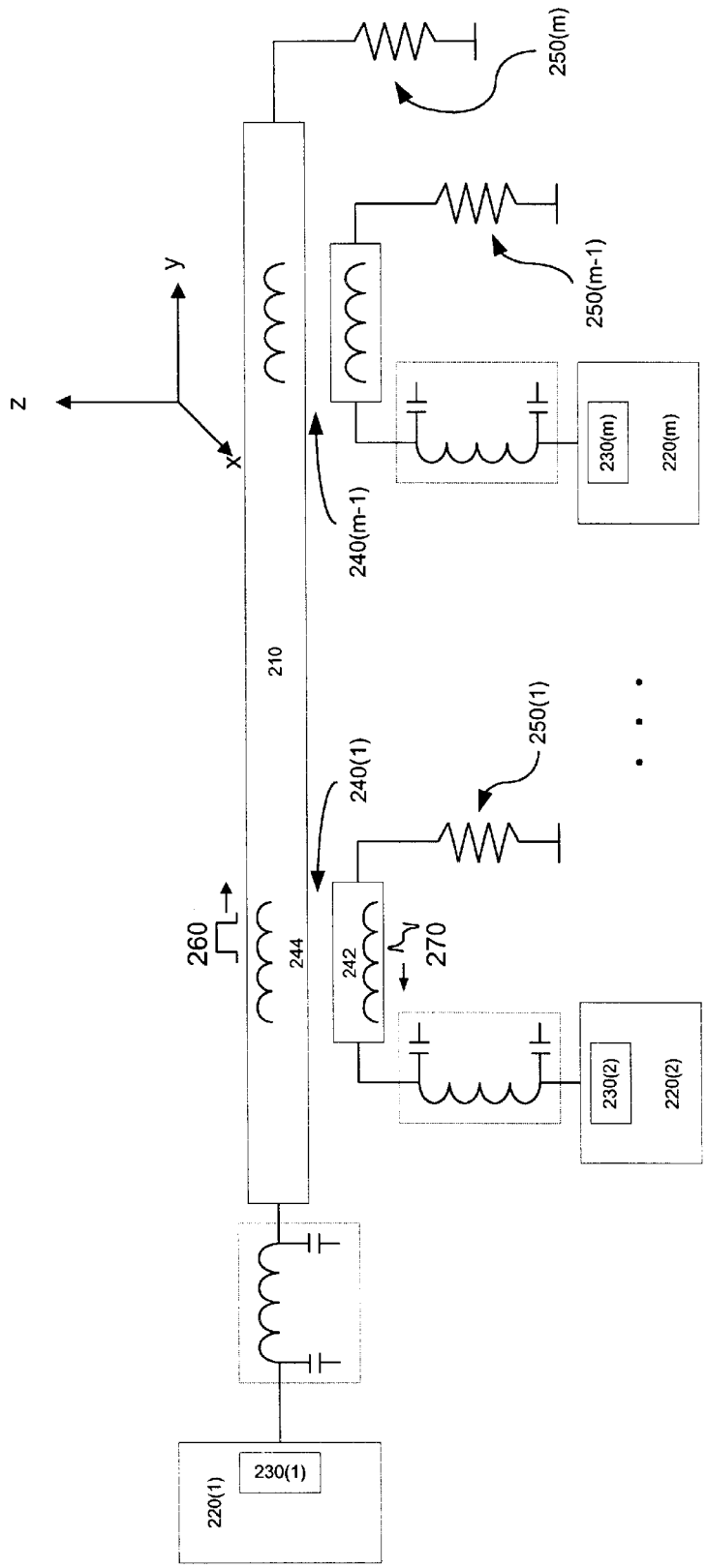
FIG. 1 is a block diagram representing an electromagnetically-coupled bus system.

FIG. 1 is a schematic representation of one embodiment of a multi-drop bus system 200. Signals are transmitted electromagnetically between a device, e.g. device 220(2), and bus 210 through electromagnetic coupler 240(1). In the following discussion, electromagnetic coupling refers to the transfer of signal energy through the electric and magnetic fields associated with the signal. In general, a signal transferred across electromagnetic coupler 240 is differentiated. For example, a positive signal pulse 260 on bus side 244 of electromagnetic coupler 240 becomes a positive/negative-going pulse 270 on device side 242 of electromagnetic coupler 240. The modulation scheme(s) employed in system 200 is selected to accommodate the amplitude attenuation and signal differentiation associated with electromagnetic couplers 240 without degrading the reliability of the communication channel.

For one embodiment of the invention, multi-drop bus system 200 is a computer system and devices 220 correspond to various system components, such as processors, memory modules, system logic and the like.

In the following discussion, various time-domain modulation schemes are used for purposes of illustration. The benefits of the present invention are not limited to the disclosed modulation schemes. Other time-domain modulation schemes, such as shape modulation (varying the number of edges in a pulse), narrowband and wideband frequency-domain modulation schemes, such as frequency modulation, phase modulation, and spread spectrum, or combinations of both time and frequency-domain modulation schemes (a pulse superposed with a high frequency sinusoid), are also suitable for use with this invention.

FIG. 2 is a schematic representation of a signal 410 that illustrates the interplay between $F_s$, $N_s$, and various modulation schemes that may be employed to encode multiple data bits into a symbol. Signal 410 includes a modulated symbol 420 transmitted in a symbol period ($F_s^{-1}$). For purposes of illustration, phase, pulse-width, rise-time, and amplitude modulation schemes are shown encoding five bits of data ($N_s$=5) in symbol 420. The present invention may implement these modulation schemes as well as others, alone or in combination, to increase the bandwidth for a particular system. The modulation scheme(s) may be selected by considering the bit interval (see below), noise sources, and circuit limitations applicable to each modulation scheme under consideration, and the symbol period available for a given frequency.

In the following discussion, a "pulse" refers to a signal waveform having both a rising edge and a falling edge. For pulse-based signaling, information may be encoded, for example, in the edge positions, edge shapes (slopes), and signal amplitudes between edge pairs. The present invention is not limited to pulse-based signaling, however. Other signal waveforms, such as edge-based signaling and various types of amplitude, phase, or frequency-modulated periodic waveforms may be implemented as well. The following discussion focuses on modulation of pulse-based signaling schemes to elucidate various aspects of the present invention, but these schemes are not necessary to practice the invention. Considerations similar to those discussed below for pulse-based signaling may be applied to other signal waveforms to select an appropriate modulation scheme.

For signal 410, the value of a first bit (0 or 1) is indicated by where ($p_0$ or $p_1$) the leading edge of symbol 420 occurs in the symbol period (phase modulation or PM). The values of second and third bits are indicated by which of four possible widths ($w_0$, $w_1$, $w_2$, $w_3$) the pulse has (pulse-width modulation or PWM). The value of a fourth bit is indicated by whether the falling edge has a large ($rt_0$) or small ($rt_1$) slope (rise-time modulation or RTM), and the value of a fifth bit is indicated by whether the pulse amplitude is positive or negative ($a_0$, $a_1$) (amplitude modulation or AM). Bold lines indicate an actual state of symbol 420, and dashed lines indicate other available states for the described encoding schemes. A strobe is indicated within the symbol period to provide a reference time with which the positions of the rising and falling edges may be compared. The number of bits encoded by each of the above-described modulation schemes is provided solely for illustration. In addition, RTM may be applied to the rising and/or falling edges of symbol 420, and AM may encode bits in the magnitude and/or sign of symbol 420.

PM, PWM, and RTM are examples of time-domain modulation schemes. Each time-domain modulation scheme encodes one or more bits in the time(s) at which one or more events, such as a rising edge or a rising edge followed by a falling edge, occur in the symbol period. That is, different bit states are represented by different event times or differences between event times in the symbol period. A bit interval associated with each time-domain modulation scheme represents a minimum amount of time necessary to reliably distinguish between the different bit states of the scheme. The modulation schemes selected for a particular system, and the number of bits represented by a selected modulation scheme is determined, in part, by the bit intervals of the candidate modulation schemes and the time available to accommodate them, i.e. the symbol period.

In FIG. 2, $t_1$ represents a minimum time required to distinguish between $p_0$ and $p_1$ for a phase modulation scheme. One bit interval of duration $t_1$ is allocated within the symbol period to allow the pulse edge to be reliably assigned to $p_0$ or $p_1$. The value of $t_1$ depends on noise and circuit limitations that can interfere with phase measurements. For example, if the strobe is provided by a clock pulse, clock jitter may make the strobe position (time) uncertain, which increases the minimum interval necessary to reliably distinguish between $p_0$ and $p_1$. Various circuit limitations and solutions are discussed below in greater detail.

Similarly, one bit interval of duration $t_3$ is allocated within the symbol period to allow the two states ($rt_0$, $rt_1$) to be distinguished reliably. The size of $t_3$ is determined by noise and circuit limitations associated with rise time measurements. For example, rise times are differentiated by passing through coupler 240. Consequently, $t_3$ must be long enough to allow the measurement of a second derivative.

Three bit intervals of duration $t_2$ are allocated within the symbol period to allow the four states ($w_0$, $w_1$, $w_2$, $w_3$) to be reliably distinguished. The size of $t_2$ is determined by noise and circuit limitations associated with pulse width measurements. If pulse width is determined relative to a clock strobe, considerations regarding clock jitter may apply. If pulse width is determined relative to, e.g., the leading edge of a pulse, considerations such as supply voltage variations between the measurements of the leading and trailing edges may apply.

In general, the time needed to encode an n-bit value in a time-domain modulation scheme (i) that has a bit interval, $t_i$, is $(2^n-1)$ $t_i$. If non-uniform bit intervals are preferred for noise or circuit reasons, the total time allotted to a modulation scheme is the sum of all of its bit intervals. When multiple time-domain modulation schemes are employed, the symbol period should be long enough to accommodate $\Sigma(2^{n(i)}=1)\sim t_i$, plus any additional timing margins. Here, the summation is over all time-domain modulation schemes used. In the above example, the symbol period should accommodate $t_1+t_3+3t_2$, plus any other margins or timings. These may include minimum pulse widths indicated by channel bandwidth, residual noise, and the like.

Using multiple encoding schemes reduces the constraints on the symbol time. For example, encoding five bits using pulse width modulation alone requires at least 31~$t_2$. If $t_2$ is large enough, the use of the single encoding scheme might require a larger symbol period (lower symbol frequency) than would otherwise be necessary.

A minimum resolution time can also be associated with amplitude modulation. Unlike the time domain modulation schemes, amplitude modulation encodes data in pulse properties that are substantially orthogonal to edge positions. Consequently, it need not add directly to the total bit intervals accommodated by the symbol period. For example, amplitude modulation uses the sign or magnitude of a voltage level to encode data.

The different modulation schemes are not completely orthogonal, however. In the above example, two amplitude states (positive and negative) encode one bit, and the minimum time associated with this interval may be determined, for example, by the response time of a detector circuit to a voltage having amplitude, A. The pulse width should be at least long enough for the sign of A to be determined. Similarly, a symbol characterized by rise-time state $rt_1$ and width state $w_3$ may interfere with a next symbol characterized by phase state $p_0$. Thus, noise and circuit limitations (partly summarized in the bit intervals), the relative independence of modulation schemes, and various other factors are considered when selecting modulation schemes to be used with the present invention.

FIG. 3A is a block diagram of an embodiment 500 of interface 230 suitable for processing multi-bit symbols for devices 220(2)–220(m). For example, interface 500 may be used to encode outbound bits from, e.g., device 220(2) into a corresponding symbol for transmission on bus 210, and to decode a symbol received on bus 210 into inbound bits for use by device 220(2).

The disclosed embodiment of interface 230 includes a transceiver 510 and a calibration circuit 520. Also shown in FIG. 3A is device side component 242 of electromagnetic coupler 240 to provide a transferred waveform to transceiver 510. For example, the transferred waveform may be the differentiated waveform generated by transmitting pulse 420 across electromagnetic coupler 240. A device side component 242 is provided for each channel, e.g. bus trace, on which interface 230 communicates. A second device side component 242' is indicated for the case in which differential signaling is employed.

Transceiver 510 includes a receiver 530 and a transmitter 540. Receiver 530 recovers the bits encoded in the transferred waveform on device side component 242 of electromagnetic coupler 240 and provides the recovered bits to the device associated with interface 230. Embodiments of receiver 530 may include an amplifier to offset the attenuation of signal energy on transmission across electromagnetic coupler 240. Transmitter 540 encodes data bits provided by the associated device into a symbol and drives the symbol onto device side 242 of electromagnetic coupler 240.

Calibration circuit 520 manages various parameters that may impact the performance of transceiver 510. For one embodiment of interface 230, calibration circuit 520 may be used to adjust termination resistances, amplifier gains, or signal delays in transceiver 510, responsive to variations in process, temperature, voltage, and the like.

FIG. 3B is a block diagram of an embodiment 504 of interface 230 that is suitable for processing encoded symbols for a device that is directly connected to the communication channel. For example, in system 200 (FIG. 1), device 220(1) may represent the system logic or chipset of a computer system that is directly connected to a memory bus (210), and devices 220(2)–220(m) may represent memory modules for the computer system. Accordingly, a DC connection 506 is provided for each channel or trace on which interface 504 communicates. A second DC connection 506' (per channel) is indicated for the case in which differential signaling is employed. Interface 504 may include a clock synchronization circuit 560 to account for timing differences in signals forwarded from different devices 220(2)–220(m) and a local clock.

Figure 4:
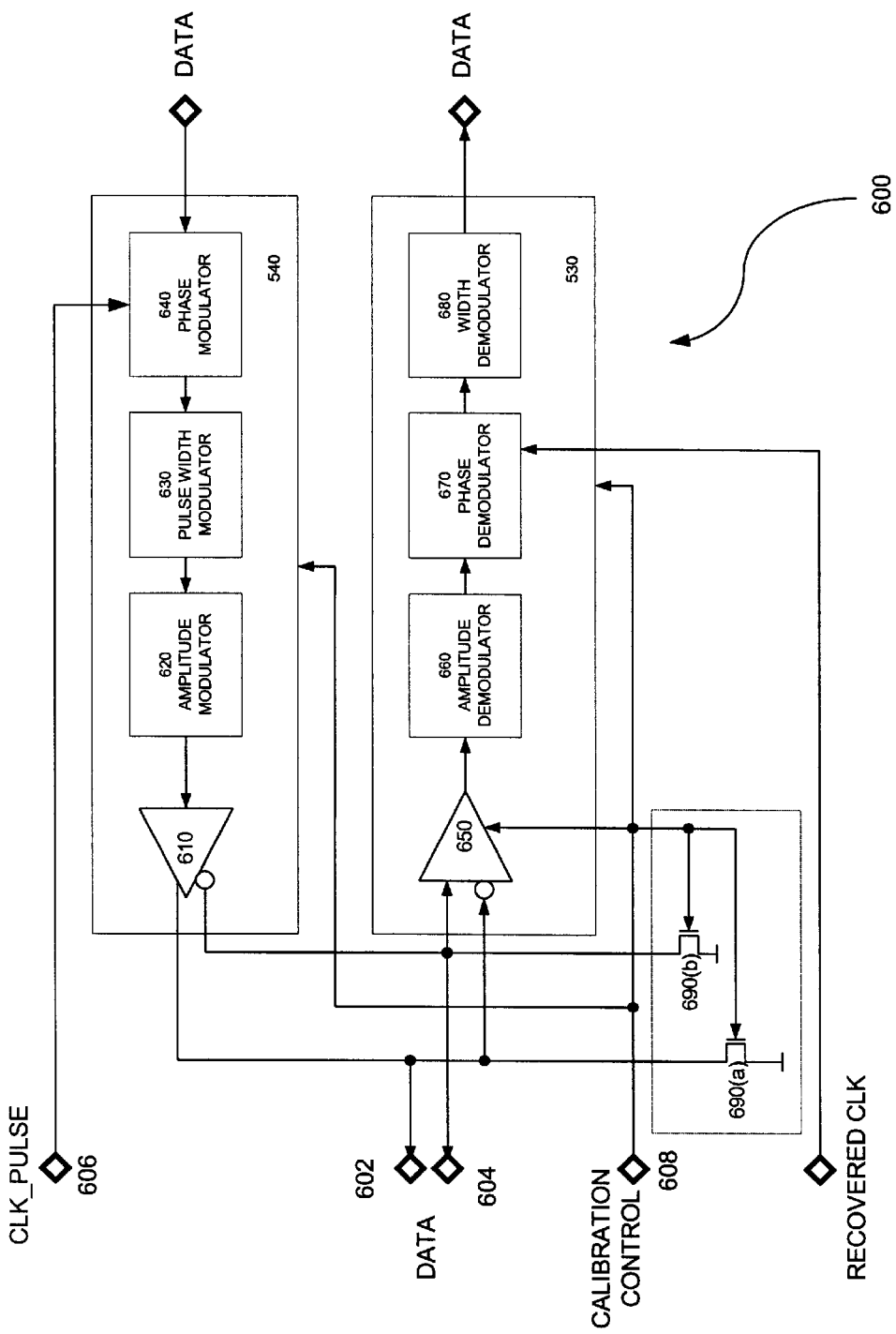
FIG. 4 is a block diagram of a transceiver module.

FIG. 4 is a block diagram representing an embodiment 600 of transceiver 510 that is suitable for handling waveforms in which data bits are encoded using phase, pulse-width and amplitude modulation, and the strobe is provided by a clock signal. Transceiver 600 supports differential signaling, as indicated by data pads 602, 604, and it receives calibration control signals from, e.g., calibration circuit 520, via control signals 608.

For the disclosed embodiment of transceiver 510, transmitter 540 includes a phase modulator 640, a pulse-width modulator 630, an amplitude modulator 620 and an output buffer 610. Output buffer 610 provides inverted and non-inverted outputs to pads 602 and 604, respectively, to support differential signaling. A clock signal is provided to phase modulator 640 to synchronize transceiver 510 with a system clock. The disclosed configuration of modulators 620, 630, and 640 is provided only for purposes of illustration. The corresponding modulation schemes may be applied in a different order or two or more schemes may be applied in parallel.

The disclosed embodiment of receiver 530 includes an amplifier 650, an amplitude demodulator 660, a phase demodulator 670, and a pulse-width demodulator 680. The order of demodulators 660, 670, and 680 is provided for illustration and is not required to implement the present invention. For example, various demodulators may operate on a signal in parallel or in an order different from that indicated.

Devices 690(*a*) and 690(*b*) (generically, "device 690") act as on-chip termination impedances, which in one embodiment of this invention are active while interface 230 is receiving. The effectiveness of device 690 in the face of, e.g., process, temperature, and voltage variations may be aided by calibration circuit 520. For transceiver 600, device 690 is shown as an N device, but the desired functionality may be provided by multiple N and/or P devices in series or in parallel. The control provided by calibration circuit 520 may be in digital or analog form, and may be conditioned with an output enable.

Figure 5A:
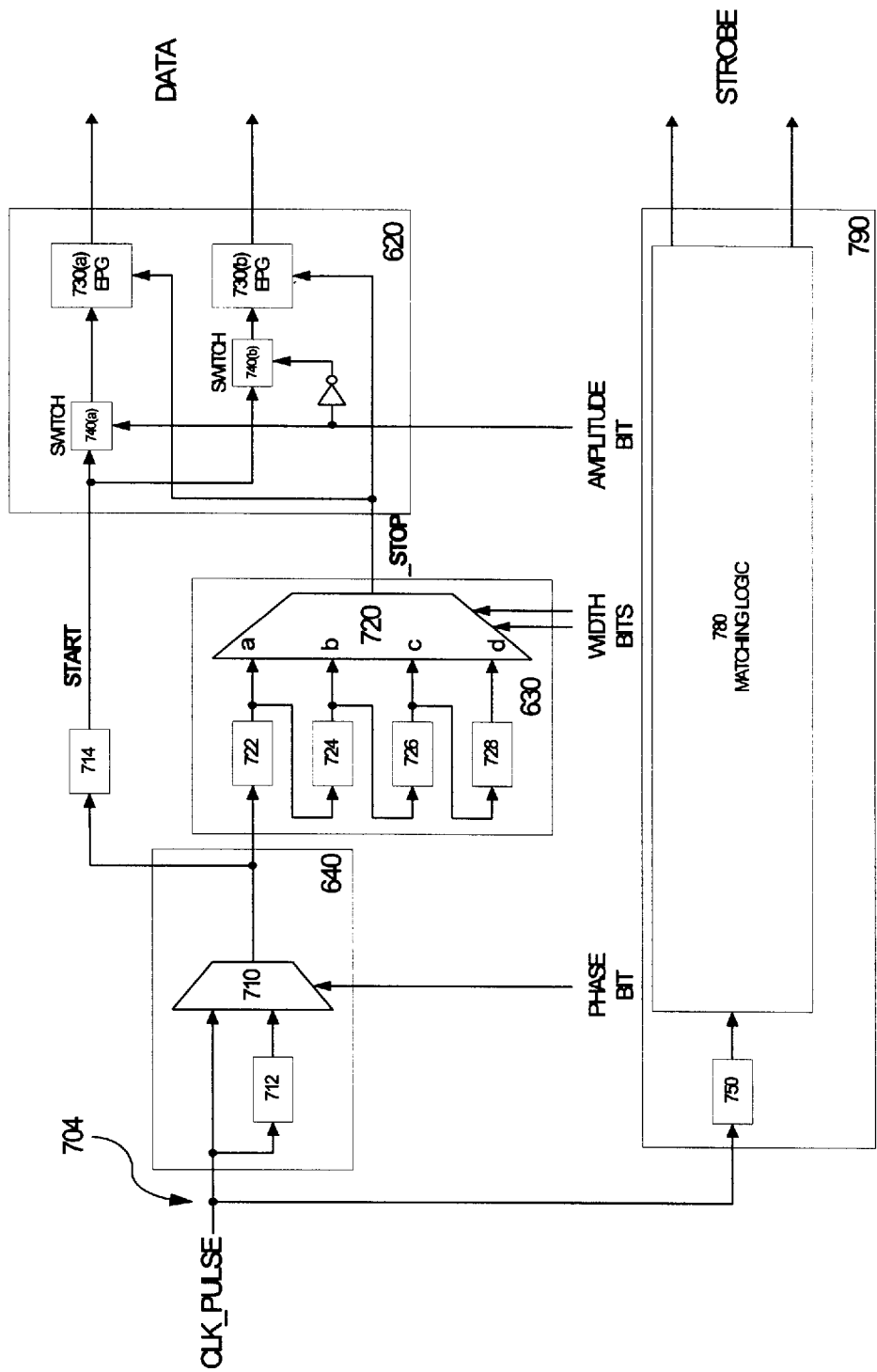

FIG. 5A is a circuit diagram of one embodiment of transmitter 540 and its component modulators 620, 630, 640. Also shown is a strobe transmitter 790 suitable for generating a strobe signal, which may be transmitted via bus 210. For one embodiment of system 200, two separate strobes are provided. One strobe is provided for communications from device 220(1) to devices 220(2) through 220(m), and another strobe is provided for communications from devices 220(2) through 220(m) back to device 220(1).

The disclosed embodiment of transmitter 540 modulates a clock signal (CLK_PULSE) to encode four outbound bits per symbol period. One bit is encoded in the symbol's phase (phase bit), two bits are encoded in the symbol's width (width bits) and one bit is encoded in the symbol's amplitude (amplitude bit) Transmitter 540 may be used to generate a differential symbol pulse per symbol period, and strobe transmitter 790 may be used to generate a differential clock pulse per symbol period.

Phase modulator 640 includes a MUX 710 and delay module (DM) 712. MUX 710 receives a delayed version of CLK_PULSE via DM 712 and an undelayed version of CLK_PULSE from input 704. The control input of MUX 710 transmits a delayed or undelayed first edge of CLK_PULSE responsive to the value of the phase bit. In general, a phase modulator 640 that encodes p phase bits may select one of $2^p$ versions of CLK_PULSE subject to different delays. For the disclosed embodiment, the output of phase modulator 640 indicates the leading edge of symbol 420 and serves as a timing reference for generation of the trailing edge by width modulator 630. A delay-matching block (DMB) 714 is provided to offset circuit delays in width modulator 630 (such as the delay of MUX 720) which might detrimentally impact the width of symbol 420. The output of DMB 714 is a start signal (START), which is provided to amplitude modulator 620 for additional processing.

Width modulator 630 includes DMs 722, 724, 726, 728, and MUX 720 to generate a second edge that is delayed relative to the first edge by an amount indicated by the width bits. The delayed second edge forms a stop signal (_STOP) that is input to amplitude modulator 620 for additional processing. For the disclosed embodiment of transmitter 540, two bits applied to the control input of MUX 720 select one of four different delays for the second edge, which is provided at the output of MUX 720. Inputs a, b, c, and d of MUX 720 sample the input signal, i.e. the first edge, following its passage through DMs 722, 724, 726, and 728, respectively. If the width bits indicate input c, for example, the second edge output by MUX 720 is delayed by DM 722+DM 724+DM 726 relative to the first edge.

Amplitude modulator 620 uses START and _STOP to generate a symbol pulse having a first edge, a width, and a polarity indicated by the phase, width, and amplitude bits, respectively, provided to transmitter 540 for a given symbol period. Amplitude modulator 620 includes switches 740(*a*) and 740(*b*) which route START to edge-to-pulse generators (EPG) 730(*a*) and 730(*b*), respectively, depending on the state of the amplitude bit. Switches 740 may be AND gates, for example. _STOP is provided to second inputs of EPGs 730(*a*) and 730(*b*) (generically, EPG 730). On receipt of START, EPG 730 initiates a symbol pulse, which it terminates on receipt of _STOP. Depending on which EPG 730 is activated, a positive or a negative going pulse is provided to the output of transmitter 540 via differential output buffer 610.

Strobe transmitter 790 includes DM 750 and matching logic block 780. DM 750 delays CLK_PULSE to provide a strobe signal that is suitable for resolving the data phase choices $p_0$ and $p_1$ of symbol 420. For one embodiment of strobe transmitter 790, DM 750 positions the strobe evenly between the phase bit states represented by $p_0$ and $p_1$ (FIG. 2). The strobe is used by, e.g., receiver 530 to demodulate phase by determining if the leading edge of data arrives before or after the strobe. DM 750 of strobe transmitter 790 thus corresponds to phase modulator 640 of data transmitter 540. Matching logic block 780 duplicates the remaining circuits of transmitter 540 to keep the timing of the strobe consistent with the data, after DM 750 has fixed the relative positioning.

In general, DM 750 and matching logic block 780 duplicate for the strobe the operations of transmitter 540 on data signals at the level of physical layout. Consequently, this delay matching is robust to variations in process, temperature, voltage, etc. In addition, the remainder of the communication channel from the output of transmitter 540, through board traces, electromagnetic coupler 240, board traces on the other side of coupler 240, and to the inputs of receiver 530 at the receiving device, may be matched in delays between data and strobe in order to keep the chosen relative timing. However, the matching of delays is one embodiment described for illustrative purposes and is not necessary to practice this invention. For example, if the circuits and remainder of the channel do not maintain matched data to strobe delays, receivers may calibrate for the relative timing of the strobe or even compensate for the absence of a strobe by recovering the timing from appropriately encoded data.

FIG. 5B is a schematic diagram of one embodiment of a programmable delay module (DM) 770 that is suitable for use with the present invention. For example, one or more DMs 770 may be used for any of DMs 712, 722, 724, 726, 728, and 750 in the disclosed embodiment of transmitter 540 to introduce programmable delays in START and _STOP. DM 770 includes inverters 772(*a*) and 772(*b*) that are coupled to reference voltages $V_1$ and $V_2$ through first and second transistor sets 774(*a*), 774(*b*) and 776(*a*), 776(*b*), respectively. Reference voltages $V_1$ and $V_2$ may be the digital supply voltages in some embodiments. Programming signals, $P_1$–$P_j$ and $n_1$–$n_k$, applied to transistor sets 774(*a*), 774(*b*) and 776(*a*), 776(*b*), respectively, alter the conductances seen by inverters 772(*a*) and 722(*b*) and, consequently, their speeds. As discussed below in greater detail, calibration circuit 520 may be used to select programming signals, $p_1$–$p_j$ and $n_1$–$n_k$, for inverters 772(*a*) and 772(*b*).

FIG. 5C is a schematic diagram of one embodiment of EPG 730 that is suitable for use with the present invention. The disclosed embodiment of EPG 730 includes transistors 732, 734, and 736 and inverter 738. The gate of N-type transistor 734 is driven by START. A positive-going edge on START indicates the beginning of a symbol pulse. The gates of P and N-type transistors 732 and 736, respectively, are driven by _STOP, which, for EPG 730(*a*) and 730(*b*) in FIG. 5A, is a delayed, inverted copy of START. A negative-going edge on _STOP indicates the end of a symbol pulse. When _STOP is high, transistor 732 is off and transistor 736 is on. A positive-going edge on START turns on transistor 734, pulling node N low and generating a leading edge for a symbol pulse at the output of EPG 730. A subsequent negative-going edge on _STOP, turns off transistor 736 and turns on transistor 732, pulling node N high and terminating the symbol pulse.

For a given symbol pulse, START may be deasserted (negative-going edge) before or after the corresponding _STOP is asserted. For example, the disclosed embodiment of transmitter 540 is timed with CLK_PULSE, and higher symbol densities may be obtained by employing narrow CLK_PULSEs. The widths of START and _STOP are thus a function of the CLK_PULSE width, while the separation between START and _STOP is a function of the width bits. The different possible relative arrivals of the end of START and beginning of _STOP may adversely impact the modulation of symbol 420 by the width bits. Specifically, transistor 734 may be on or off when a negative-going edge of _STOP terminates the symbol pulse. Node N may thus either be exposed to the parasitic capacitances at node P through transistor 734, or not. This variability may affect the delay of the trailing symbol edge through EPG 730 in an unintended way.

Figure 5D:
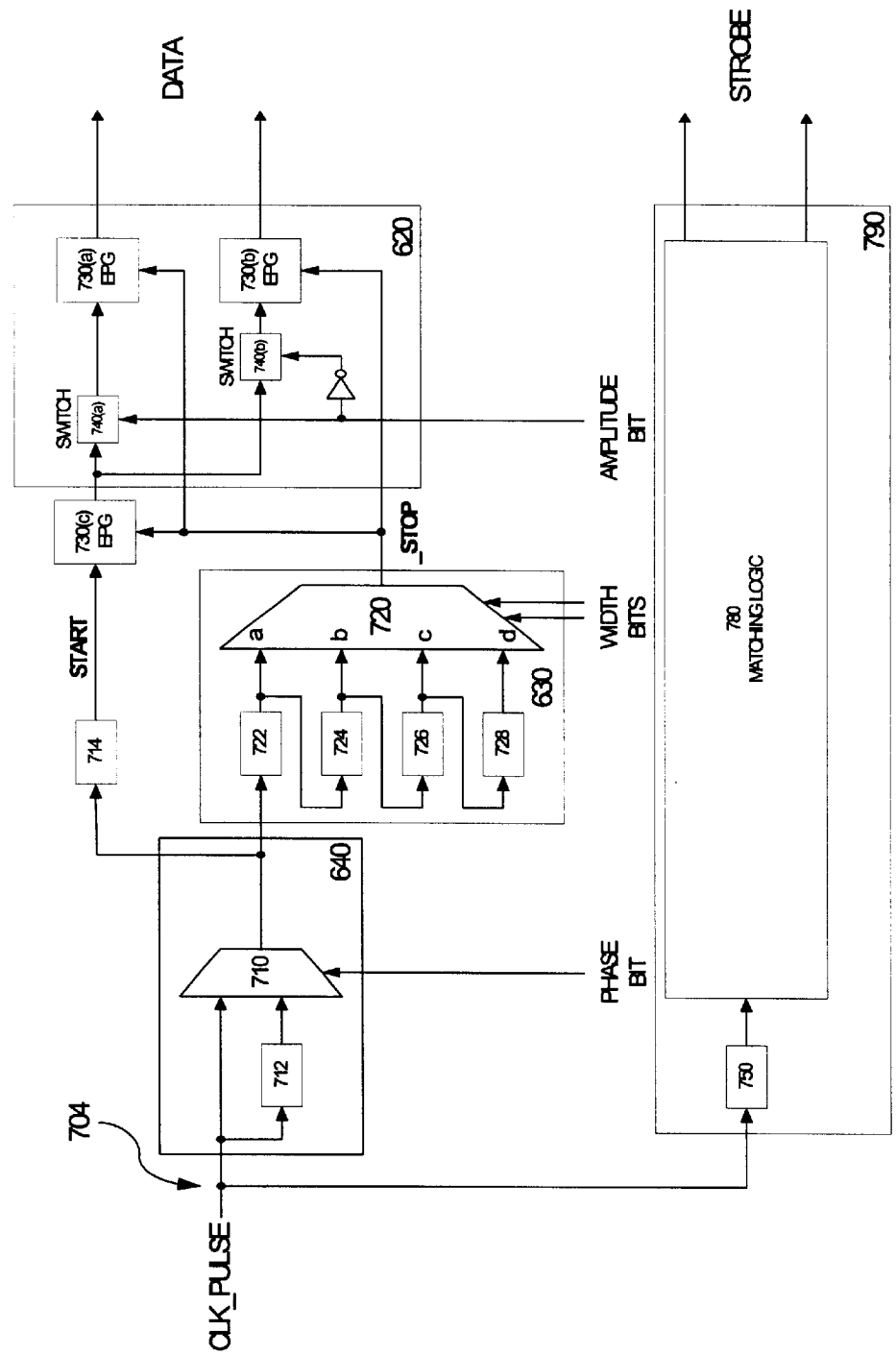

FIG. 5D is a schematic diagram of an alternative embodiment of transmitter 540 that includes an additional EPG 730(*c*). EPG 730(*c*) reshapes START to ensure a consistent timing which avoids the variability described above. Namely, the modified START is widened so that it always ends after _STOP begins. This is done by generating a new START whose beginning is indicated by the original START but whose end is indicated by the beginning of _STOP, instead of the width of CLK_PULSE. Note also that, in the alternative embodiment shown in FIG. 5D, the sum of the delays through delay matching block 714 and EPG 730(*c*) must match the unintended delays in width modulator 630.

FIGS. 6A–6E show CLK_PULSE, START, STOP, SYMBOL, and TR_SYMBOL, respectively, for one embodiment of system 200. Here, TR_SYMBOL represents the form of SYMBOL following transmission across electromagnetic coupler 240. The smaller amplitude of TR_SYMBOL relative to SYMBOL is roughly indicated by the scale change between the waveforms of FIGS. 6D and 6E. TR_SYMBOL represents the signal that is decoded by interface 230 to extract data bits for further processing by device 220. The four outbound bits encoded by each SYMBOL are indicated below the corresponding SYMBOL in the order (p, $w_1$, $w_2$, a)

Figure 7A:
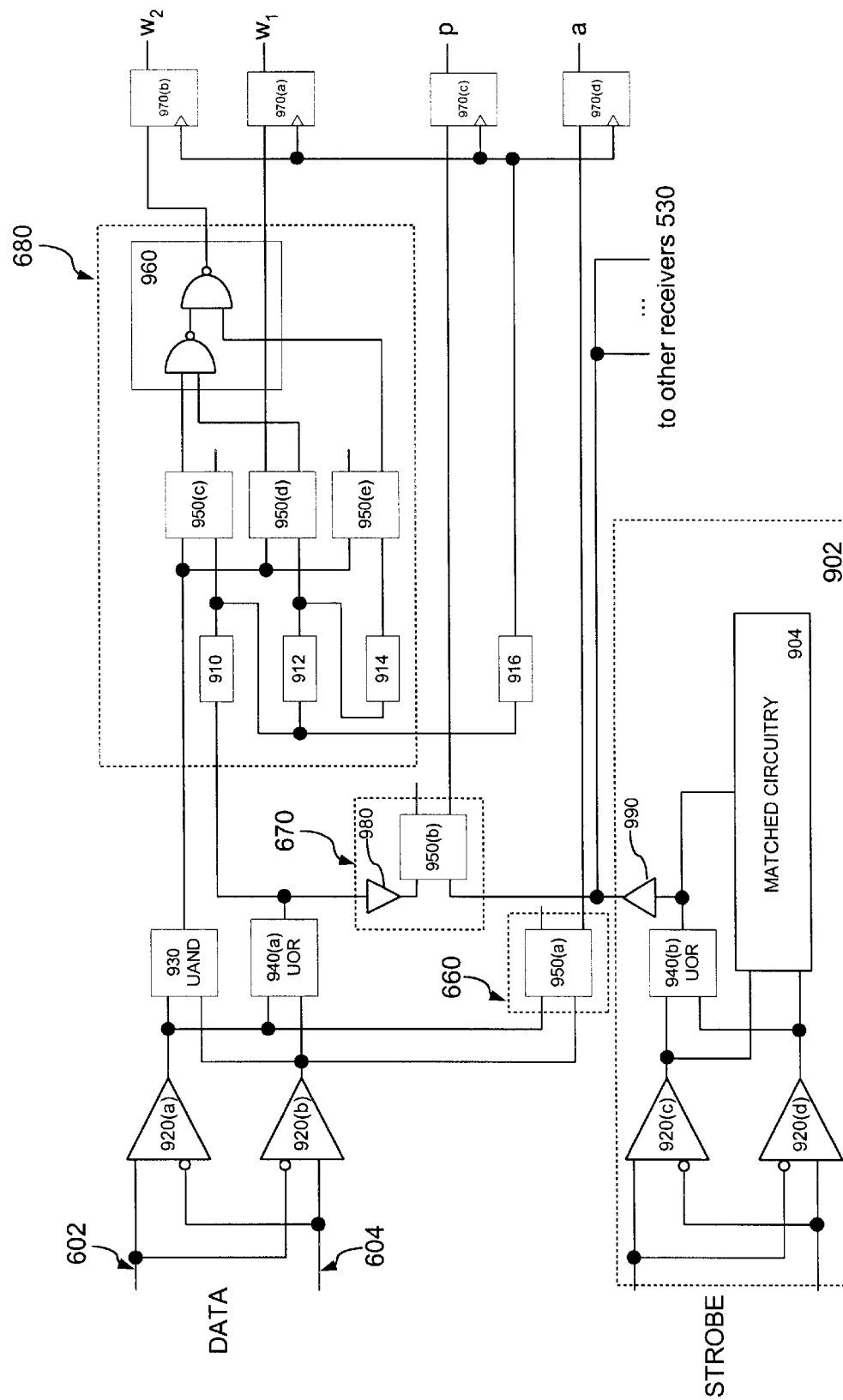
FIGS. 7A–7E are circuit diagrams for various components of the receiver of FIG. 4.

FIG. 7A is a schematic diagram representing one embodiment of receiver 530 that is suitable for use with the present invention. The disclosed embodiment of receiver 530 processes differential data signals. FIG. 7A also shows a strobe receiver 902, which is suitable for processing a differential strobe signal. Strobe receiver 902 may provide delay matching for receiver 530 similar to that discussed above. Receiver 530 and strobe receiver 902 may be used, for example, in system 200 in conjunction with the embodiments of transmitter 540 and strobe transmitter 790 discussed above.

The disclosed embodiment of receiver 530 includes differential to single-ended amplifiers 920(a) and 920(b) which compensate for the energy attenuation associated with electromagnetic coupler 240. Amplifiers 920(a) and 920(b) produce digital pulses in response to either positive or negative pulses on the transferred signal (TR_SYMBOL in FIG. 6E) and its complement, e.g. the signals at inputs 602 and 604. In addition to amplification, amplifiers 920 may latch their outputs with appropriate timing signals to provide sufficient pulse widths for succeeding digital circuits.

Matching strobe receiver 902 similarly amplifies the accompanying differential strobe signal. For the disclosed embodiment, the received strobe is used to decode phase information in data symbol 420. Strobe receiver 902 includes differential to single-ended amplifiers 920(c) and 920(d) and matched circuitry 904. Matched circuitry 904 replicates much of the remaining circuitry in receiver 530 to match delays for data and strobe signals, similar to the matching of transmitter 540 and strobe transmitter 790. One embodiment of strobe receiver 902 includes circuits that correspond to phase demodulator 670 and width demodulator 680 with some minor modifications. For example, strobe buffer 990 buffers the received strobe for distribution to multiple receivers 530, up to the number of channels in, e.g., bus 210. Strobe buffer 990 may be large, depending on the number of receivers it drives. Data buffer 980 corresponds to strobe buffer 990. To save area, data buffer 980 need not be an exact replica of strobe buffer 990. The delays can also be matched by scaling down both data buffer 980 and its loading proportionately, relative to their counterparts in strobe receiver 902.

Figure 7C:
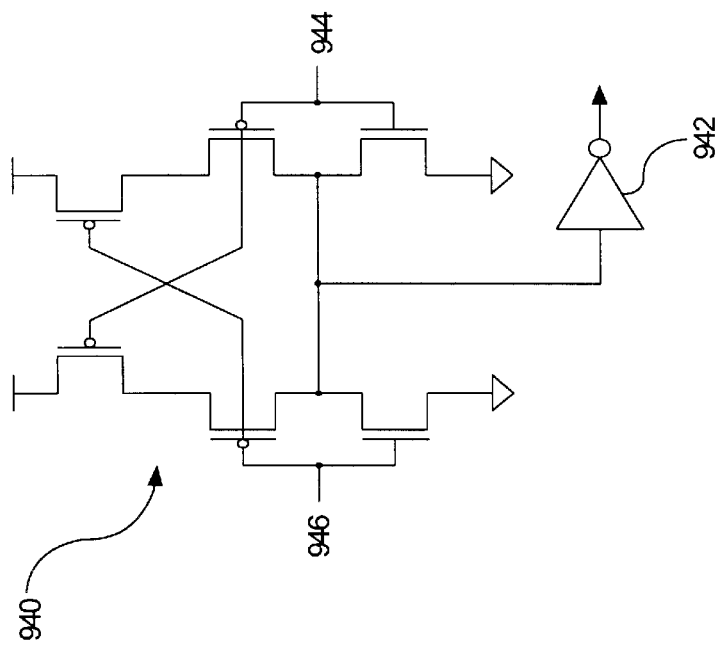
Figure 7B:
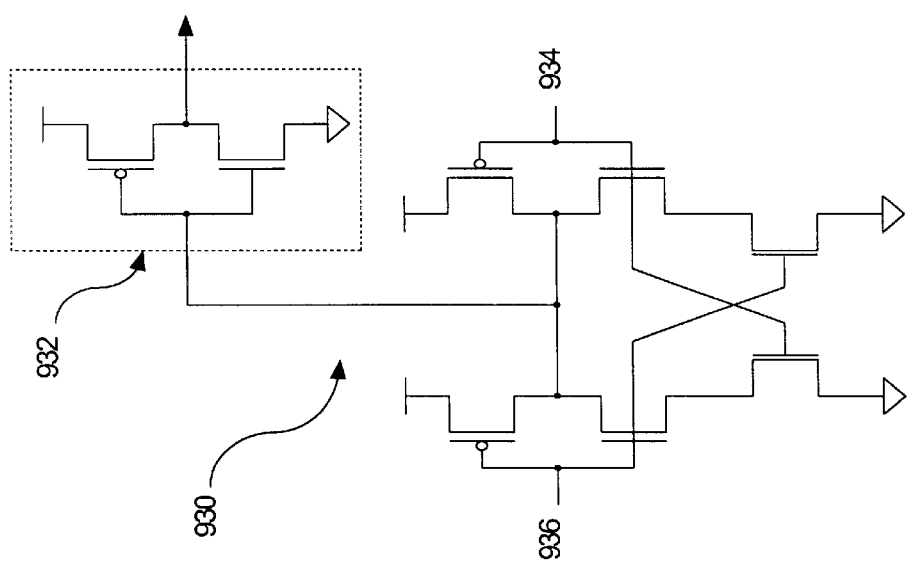

Uni-OR gate (UOR) 940(a) combines the outputs of amplifiers 920(a) and 920(b) to recover the first edge of TR_SYMBOL. The name uni-OR indicates that the propagation delay through gate 940 is uniform with respect to the two inputs. An embodiment of UOR 940 is shown in FIG. 7C. Similarly, uni-AND gate (UAND) 930 recovers the second edge of TR_SYMBOL. An embodiment of UAND 930 is shown in FIG. 7B.

Figure 7D:
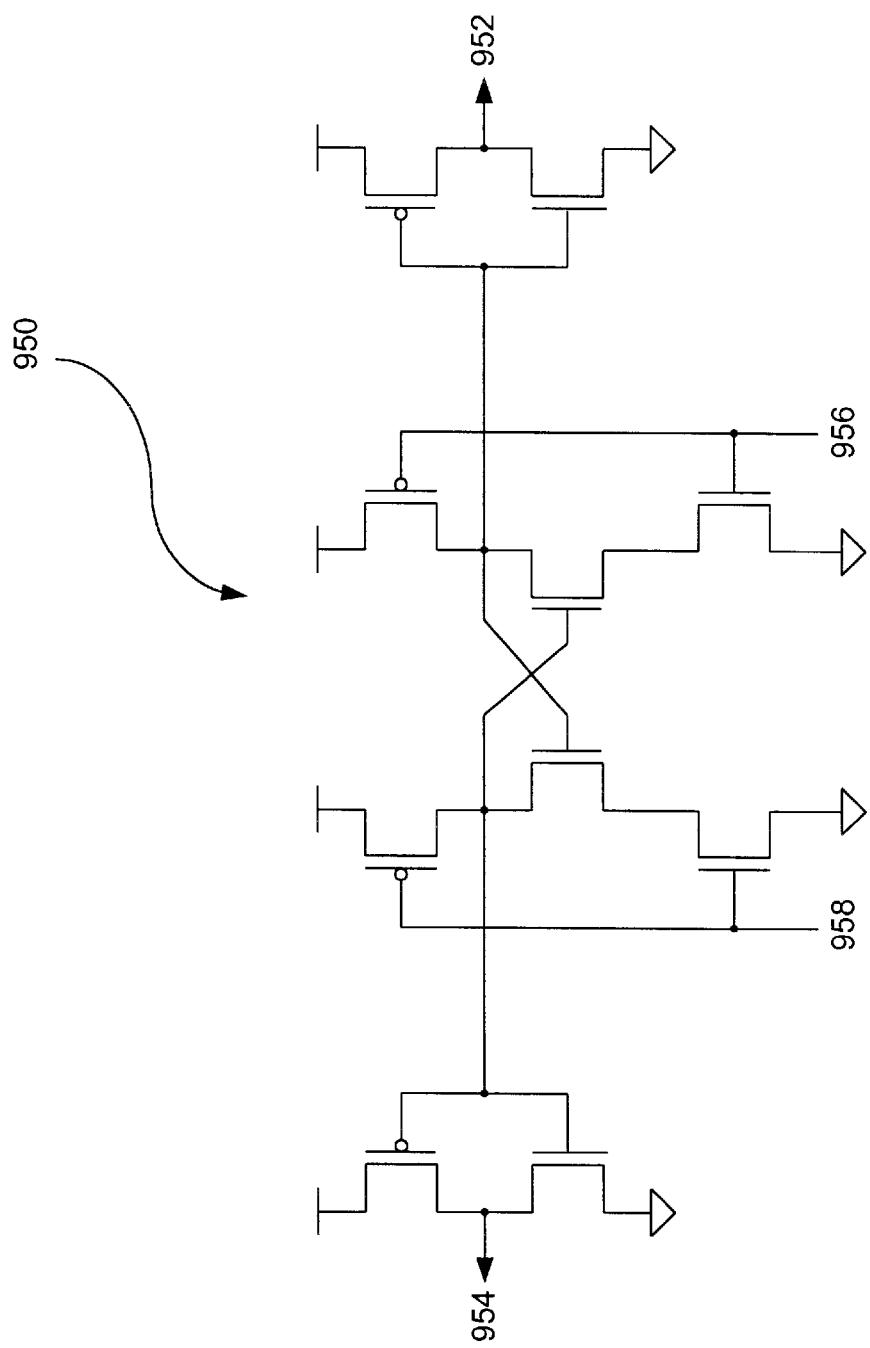

The disclosed embodiment of phase demodulator 670 includes an arbiter 950(b) (generically, "arbiter 950") and data buffer 980. Arbiter 950(b) compares the first edge recovered from the transferred symbol by UOR 940(a) with the corresponding edge from the recovered strobe by UOR 940(b), respectively, and sets a phase bit according to whether the recovered first edge of the symbol leads or follows the first edge of the strobe. An embodiment of arbiter 950 is shown in FIG. 7D. An output 952 goes high if input 956 goes high before input 958. Output 954 goes high if input 958 goes high before input 956.

Figure 7E:
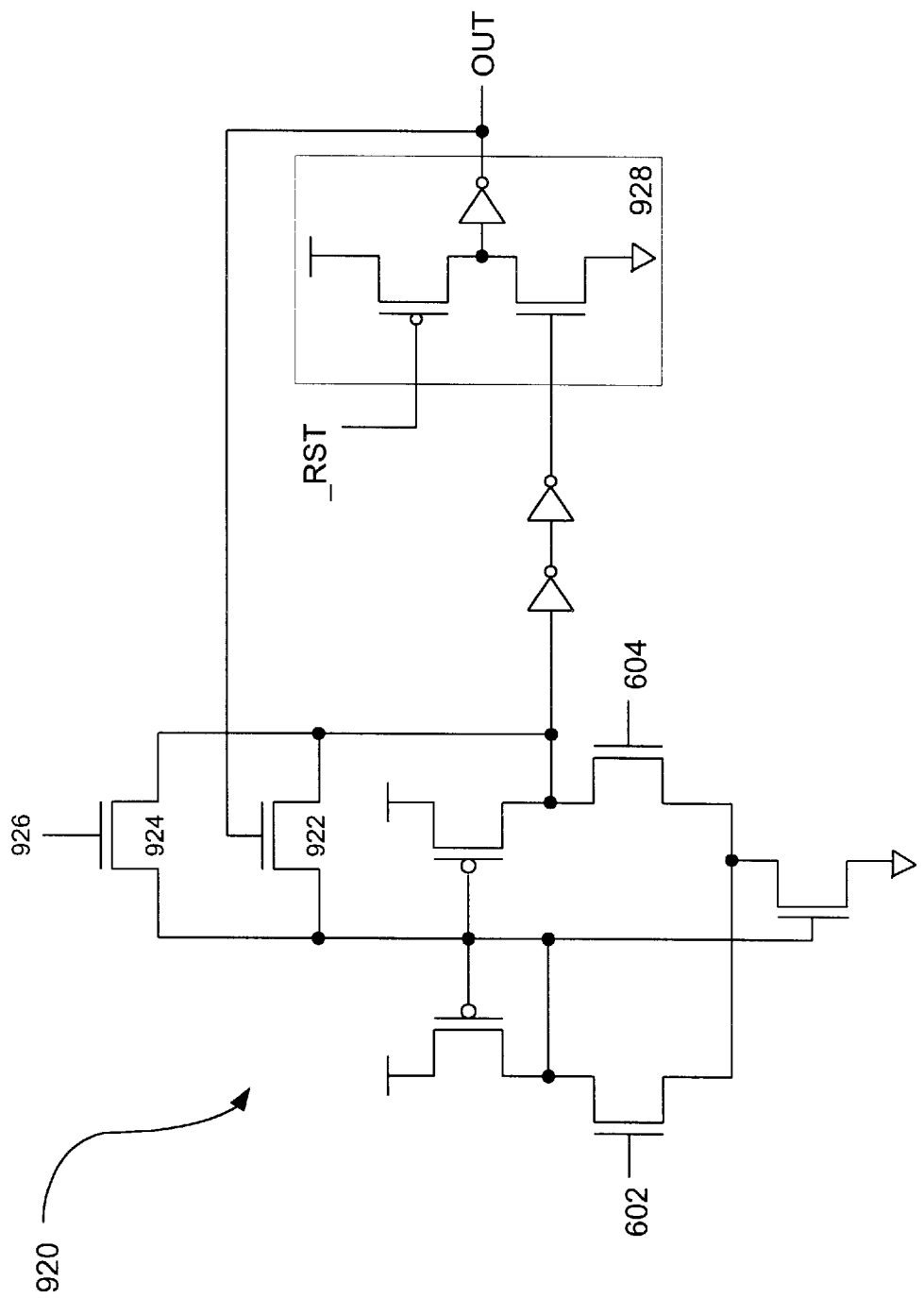

FIG. 7E is a circuit diagram representing one embodiment of amplifier 920. The disclosed embodiment of amplifier 920 includes a reset equalization device 922, a gain control device 924, and a pre-charged latch 928. Reset device 922 speeds up the resetting of amplifier 920 after a detected pulse, in preparation for the next symbol period. Gain control device 924 compensates the gain of amplifier 920 for variations in process, voltage, temperature, and the like. A control signal 926 may be provided by calibration circuit 520. More generally, device 924 may be multiple devices connected in series or parallel, and signal 926 may be several signals (analog or digital) produced by calibration circuit 520. Pre-charged latch 928 reshapes received pulses for the convenience of succeeding circuits. Resulting output pulse widths are determined by a timing signal, _RST. For one embodiment of amplifier 920, _RST is produced by DM 916 (FIG. 7A), along with other timing signals used in receiver 530. It is possible for pre-charged latch 928 and signal _RST to be in inconsistent states, due to power-on sequences or noise. Additional circuitry may be used to detect and correct such events.

The disclosed embodiment of amplitude demodulator 660 includes an arbiter 950(a) which receives the amplified transferred signals from amplifiers 920(a) and 920(b). Arbiter 950(a) sets an amplitude bit according to whether the output of amplifier 920(a) or 920(b) pulses first.

The disclosed embodiment of width demodulator 680 includes delay modules (DMs) 910, 912, 914, arbiters 950(c), 950(d), 950(e), and decoding logic 960. The recovered first symbol edge is sent through DMs 910, 912, and 914 to generate a series of edge signals having delays that replicate the delays associated with different symbol widths. For one embodiment of the invention, DMs 910, 912, and 914 may be implemented as programmable delay modules (FIG. 5B). Arbiters 950(c), 950(d), and 950(e) determine the (temporal) position of the second edge with respect to the generated edge signals. Decoding logic 960 maps this position to a pair of width bits.

Latches 970(a), 970(b), 970(c), and 970(d) receive first and second width bits, the phase bit, and the amplitude bit, respectively, at their inputs, and transfer the extracted (inbound) bits to their outputs when clocked by a clocking signal. For the disclosed embodiment of receiver 530, the latches are clocked by sampling a signal from the delay chain of width demodulator 680 through the extra delay of DM 916. This latching synchronizes the demodulated bits to the accompanying strobe timing. In addition, a device 220 may require a further synchronization of the data to a local clock, e.g. clock synchronization circuit 560 in FIG. 3B. The synchronization circuit 560 is discussed more extensively below.

The various components in an embodiment of interface 230 include a number of circuit elements that may be adjusted to compensate for process, voltage, temperature variations and the like. For example, compensation may entail adjusting the delay provided by a programmable delay module (DM 770), the gain provided by an amplifier (amplifier 920), or the termination resistance (device sets 690(a) and 690(b)).

Figure 8:
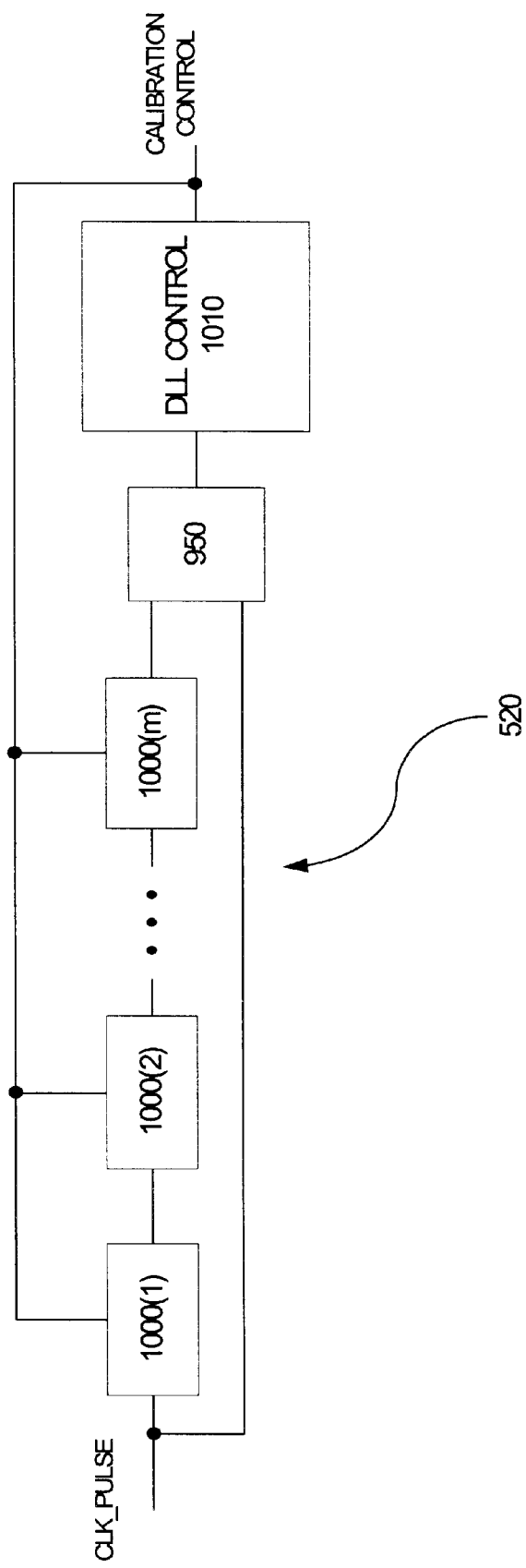
FIG. 8 is a block diagram representing a calibration circuit.

FIG. 8 shows an embodiment of a calibration circuit 520. The purpose of calibration is to use feedback to measure and compensate for variable process, temperature, voltage, and the like. The embodiment of calibration circuit 520 shown in FIG. 8 is a delay-locked loop (DLL). A clock signal (CLK_PULSE) is delayed by series-connected DMs 1000(1)–1000(m). The number of DMs is chosen so that the sum of the delays can be set to match one period of CLK_PULSE. Arbiter 950 is used to detect when the sum of the delays through DMs 1000 is less than, equal to, or more than one clock period. DLL control 1010 cycles through delay control settings until the sum of the delays matches one clock period. The established control setting reflects the effects of process, temperature, voltage, etc. on the delays of DMs

1000. Calibration circuit 520 may be operated continuously, periodically, when conditions (temperature, voltage, etc.) change, or according to any of a variety of other strategies.

The same calibration control settings can be distributed to DMs used throughout interface 230, such as DM 712, DM 910, etc. The desired delays of DMs in interface 230 are achieved by selecting a number of programmable delay modules 770 for each such DM which have the same ratio to the total number of delay modules 770 included in all the DMs 1000 as the ratio of the desired delay to the clock period. For example, if there are twenty total delay modules 770 in the sum of DMs 1000, one can select a delay of one tenth of the clock period by using two delay modules 770 for any particular DM used in interface 230. In addition, one can also choose a fractional extra delay for any particular DM by inserting small extra loads at the outputs of selected delay modules 770 which constitute that DM.

The calibration information obtained by calibration circuit 520 may also be used to control other circuit parameters, in the face of variable conditions. These may include the resistance of termination device 690 and gain of amplifier 920. This may be done by correlating the information contained in the delay control setting with the effects of like process, temperature, voltage, and like conditions on the other circuit parameters.

As described in the multi-drop bus system example above, the devices 220(2)–220(m) and the device 220(1) can communicate with each other across the bus 210. For simplicity in the following discussion, the devices 220(2) –220(m) will be referred to as slave devices ("slaves") and the device 220(1) as a master device ("master").

In this multi-drop bus environment, the master presents its clock (called the master clock, the core clock, or the system clock) to each of the slaves along the bus. The slaves each use the master clock to clock returned data signals back to the master. The slaves may send back the master clock (their version of the master clock as received by each slave at its bus position) with each returned data signal as an accompanying return clock (also called a forwarded clock). Alternately, an implicit return clock may be recovered by the master from the timing of the return data itself.

However, because of delays (e.g., propagation delays) on the bus and in slave circuitry, the received data signal and accompanying return clock may not be synchronized with the master clock. Thus, the master may not be able to process the data without resynchronizing it to the master clock. Because each of the slaves communicates with the master over the same bus (in some applications alternating from slave to slave in short bursts), and since different slaves may experience different delays with respect to the master clock, the master cannot lock onto a fairly steady and long-lived succession of return clock pulses. The master may need to know the return delay of data, including resynchronization, not just quickly, but a-priori, for example because a bus controller's scheduling algorithm may plan bus usage in advance.

The synchronization circuit 560 may be used to measure and record the phase information of each return clock required for resynchronization during a calibration time. This phase information can be used both by a bus scheduling algorithm and synchronization circuitry at run time, based on the address of the active slave, on a cycle by cycle basis. First, the master need only recover clock phase information from the return clock, as the clock's frequency is known (since it is inherited from the master clock sent to each slave to begin with). Second, the accuracy of the calibrated and recorded phase information used for resynchronization may be reduced by splitting the uses of the return clock into two categories: demodulation and resynchronization.

By guaranteeing that the data and the return clock from a slave undergo the same phase delays (within certain tolerances) from the slave to the master, the data and the return clock remain synchronous with respect to each other even though they are asynchronous with respect to the master. This guarantee can be made through circuitry such as the delay matching clock circuitry in FIGS. 5A and 7A. The return clock (manipulated in this manner to ensure this guarantee) is used by the master for phase demodulation. The master need not perform any calibration for this demodulation because the return clock differs from slave to slave and from cycle to cycle in lock step with the data.

Furthermore, while circuitry included in the master performs the demodulation, the master need not be aware of the timing through this circuitry from cycle to cycle. For example, the master receivers are bisected into two separate clock domains that operate asynchronously. Demodulation follows suit after whatever timing is provided, cycle by cycle, by the accompanying return clock, while resynchronization operates according to the master clock. This reduces the requirements on resynchronization since demodulation carries most of the accuracy burden. For example, with 1.6 Gigabits per second test chips, modulation timing accuracy ranges in the tens of picoseconds. Resynchronization accuracy, dictated by such factors as clock jitter and latch setup and hold times, may be on the order of hundreds of picoseconds.

The demodulation treatment of the forwarded clock (actually, both forwarded clocks, the clock from the master to the slaves and from the slaves to the master) is shown in FIGS. 5A–5D and 7A–7E and is described above. Note that the transceiver shown in FIGS. 5A–5D and 7A–7E may be the same for the master and the slaves, but only the master requires resynchronization through the synchronization circuit 560. The slaves only see one clock each (the forwarded clock from the master which may be used to clock all of that slave's activities: demodulation, core circuitry, etc.) as the slaves only communicate with the master and not with other slaves except through the master, whereas the master can communicate with each of the slaves, with different return clocks as previously described.

Resynchronization of the return data involves resynchronizing the now fully digital (demodulated) signals from the timing of the forwarded clock, which may vary every cycle, to the master clock for handoff to the master's core circuitry. This resynchronizing entails avoiding a danger window of setup and hold times when latching the demodulated signals. The danger window generally represents time preceding or following the system clock in which sampled data should not be switching. Avoiding latch setup/hold violations, with as short a latency as possible and so that an entire bus width of data stays lined up within the same clock cycle, requires relatively loose timing accuracy, e.g., a few hundred picoseconds. This relatively loose timing accuracy means that digital calibration data for the relative phase of each slave timing uses few bits of measurement, storage, and control and is fairly robust to changing conditions (e.g., temperature, voltage shift, AC supply noise, etc.) from calibration to runtime.

Note that the resynchronization could be performed before the demodulation. This order of operation, however, would require some non-trivial adjustments before or during resynchronization to preserve the analog information present in the received data signals.

Figure 9A:
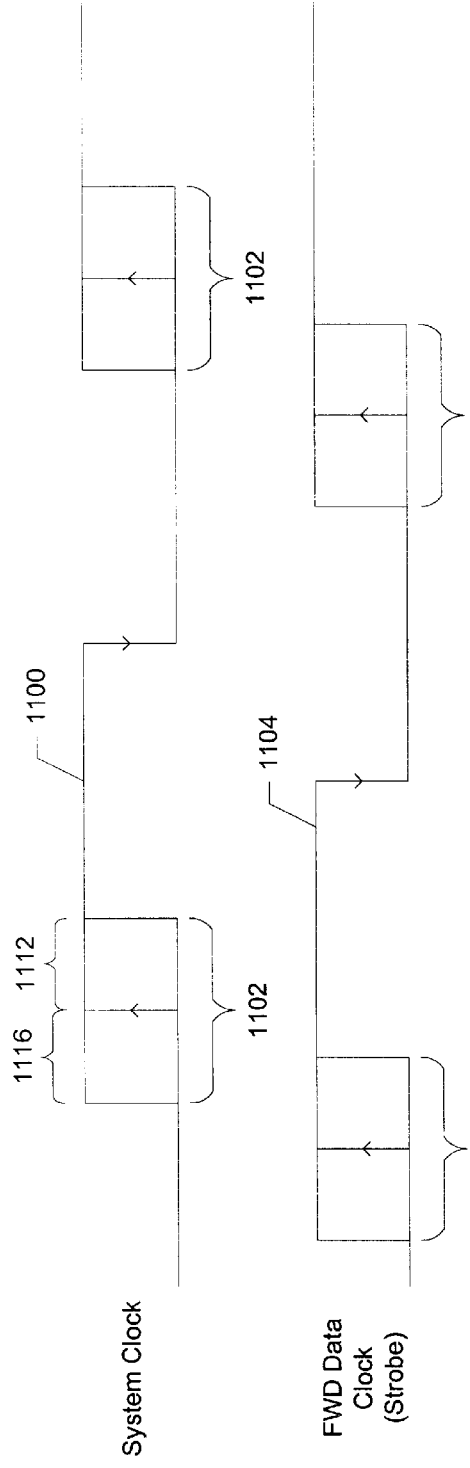
FIGS. 9A–9D show timing diagrams.

FIGS. 9A–9D show examples of a system (master) clock and three possible forwarded clocks (STROBE), respectively, that illustrate how the forwarded clock can be used to synchronize a whole data bus to the system clock. FIG. 9A shows a waveform 1100 for the system clock with a master window 1102 defined around the positive (sampling) edge of the waveform 1100. The master window 1102 represents circuit requirements and uncertainties such as setup time, hold time, clock jitter, and effects of temperature, voltage, and device mismatches on these and similar quantities. The master window 1102 represents times when return data cannot be reliably sampled.

Figure 9B:
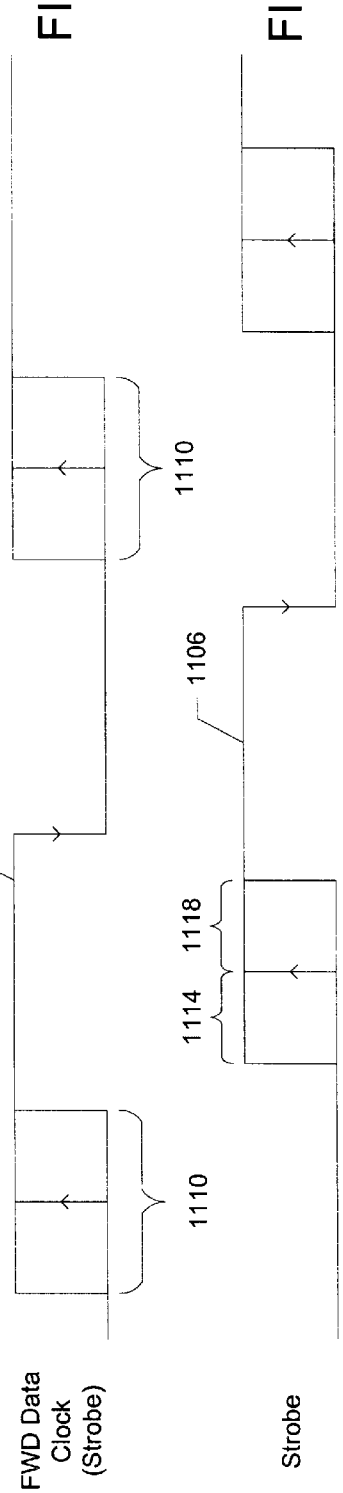
Figure 9C:
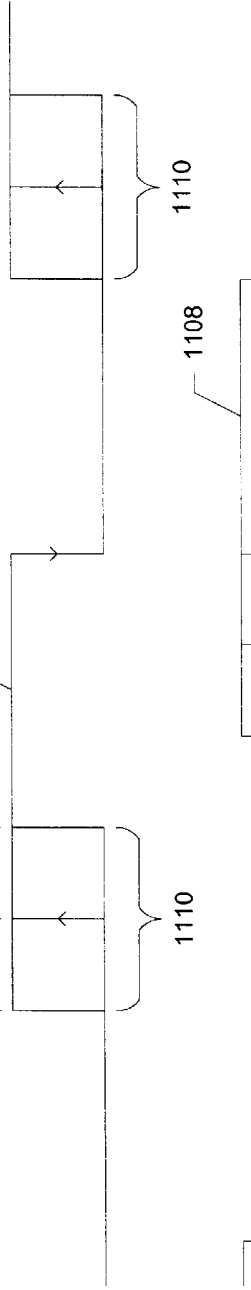
Figure 9D:
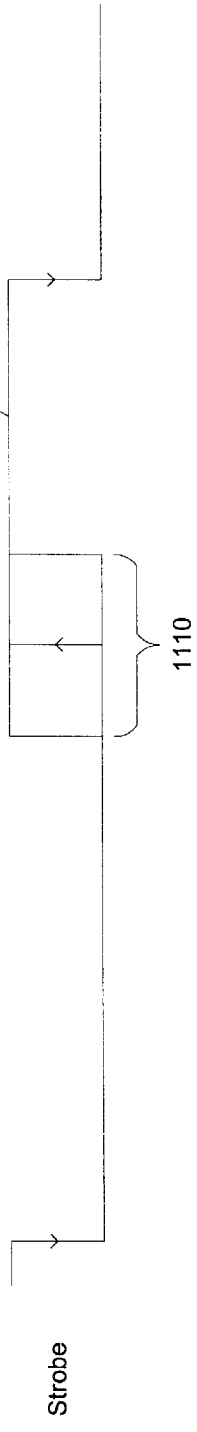

FIGS. 9B–9D show waveforms 1104, 1106, and 1108, respectively, for the forwarded clock. The positive edges of the waveforms 1104, 1106, and 1108 have slave windows 1110 defined around them. Each slave window 1110 represents variations in timing of all bus data accompanying this strobe. Such variations may include relative offsets of data phases $p_0$ and $p_1$ from the strobe, jitter, receiver delay mismatches due to device mismatches, and the effects of temperature and voltage on these and similar quantities. Each slave window 1110 represents times when return data may be switching.

A function of resynchronization is to retime demodulated data so that no part of the master window 1102 overlaps with the slave window 1110 for a particular strobe. Retiming to prevent overlap between the windows 1102 and 1110 reduces or eliminates the chance of some data being sampled during switching, which could result in incorrect latching and/or metastable behavior in latching circuits. For example, data corresponding to waveforms (STROBEs) 1104 and 1106 in FIGS. 9B and 9C, respectively, would need retiming while data corresponding to the waveform (STROBE) 1108 in FIG. 9D would not need retiming.

Figure 10:
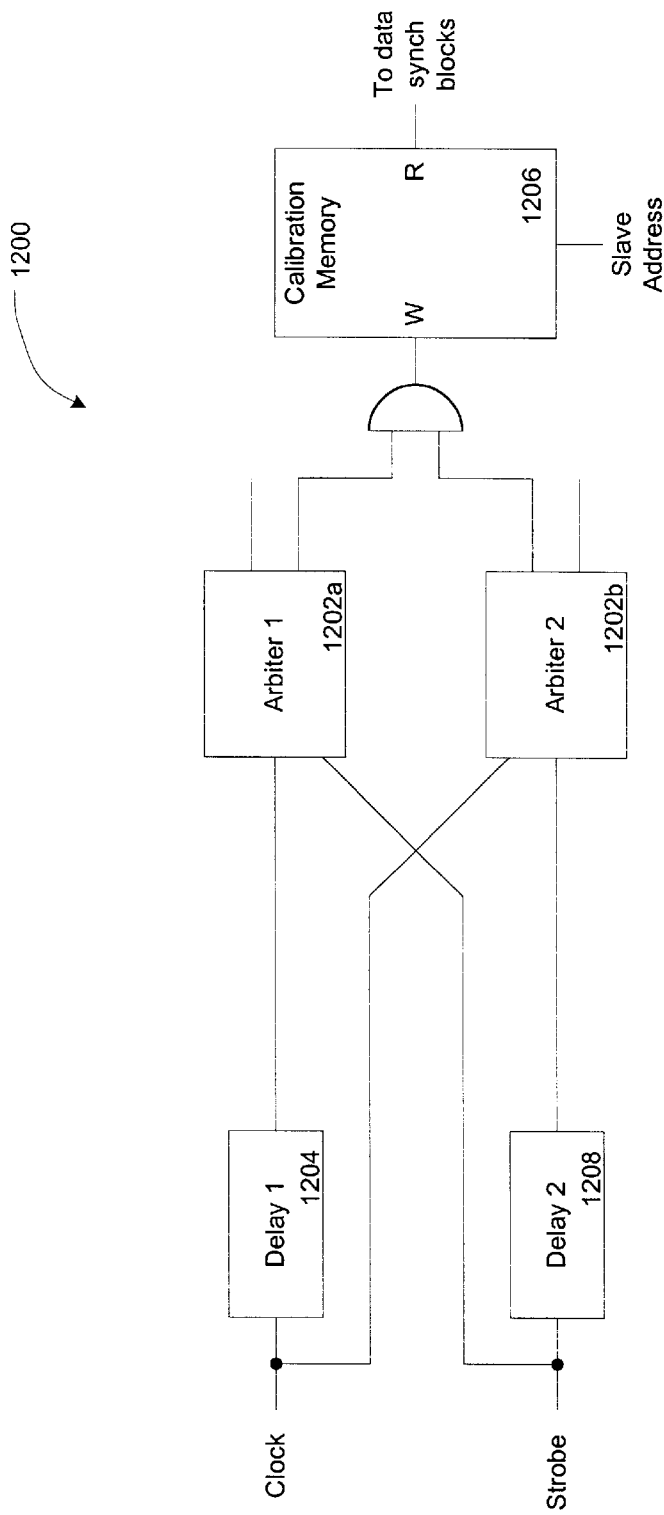
FIG. 10 is a block diagram of a measurement circuit.
Figure 11:
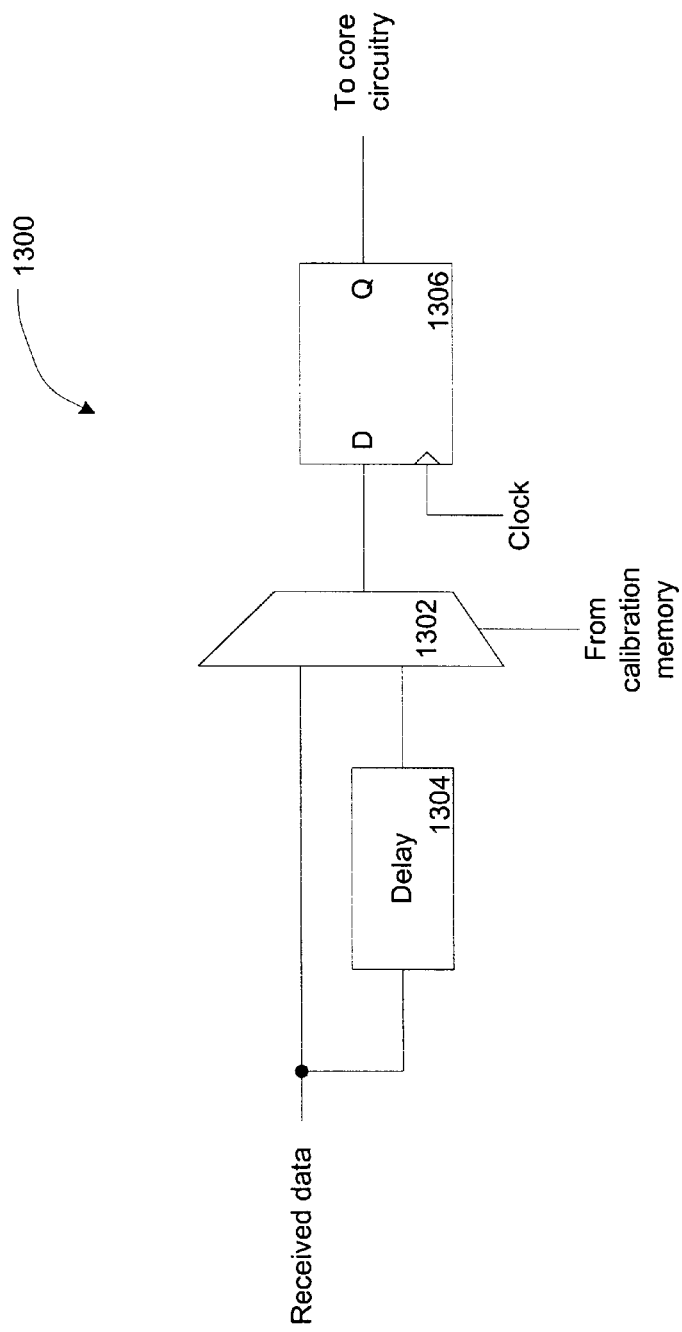
FIGS. 11–12 are block diagrams of compensation circuits.

FIG. 10 shows an example of a measurement circuit 1200 that can be used to detect, at calibration time, whether the master window 1102 overlaps with a slave window 1110. The measurement circuit 1200 detects this overlap condition for each slave and records any detected overlap conditions for run time use. FIG. 11 shows an example of a compensation circuit 1300 that can be used for all data to correct run time timing in cases where the measurement circuit 1200 detected an overlap condition. Each of the circuits 1200 and 1300 is discussed below in turn.

The measurement circuit 1200 includes first and second arbiters 1202a and 1202b that detect if the strobe is not adequately after or not adequately before the system clock, respectively. The first arbiter 1202a compares the strobe to a version of the system clock delayed by a first delay element 1204. The first delay element 1204 is chosen as the sum of part of the master window 1102 (e.g., right part 1112 in waveform 1100 in FIG. 9A) and part of a slave window 1110 (e.g., left part 1114 in waveform 1106 in FIG. 9C). Similarly, the second arbiter 1202b compares the system clock to the strobe delayed by a second delay element 1208, chosen as the sum of part of the master window 1102 (e.g., left part 1116 in waveform 1100 in FIG. 9A) and part of a slave window 1110 (e.g., right part 1118 in waveform 1106 in FIG. 9C). Examples of the arbiters 1202a and 1202b include the arbiters 950 (see FIGS. 7A and 7D). Delay elements 1204 and 1208 may include calibrated or uncalibrated elements in order to measure parts of the windows which are constant or a function of circuit speed.

If the strobe received at the master from any slave is in the danger window (i.e., is neither adequately before or after the system clock), then calibration memory 1206 records the necessity for retiming the data from that slave. The master reapplies the slave address for that slave at run time and retrieves and distributes the retiming bit to data synchronization blocks on a per clock cycle basis.

An example of such a data synchronization block is the compensation circuit 1300 of FIG. 11. The compensation circuit 1300 includes a multiplexor 1302 that chooses to pass data straight or retimed to a sampling register 1306 (e.g., a DQ flip-flop) depending on the calibrated bit. If the strobe for the currently active slave was not in the danger window, then the data is passed through. The data may experience delay in the multiplexor 1302, but this delay can be included in the calculation of the master window 1102 by effectively calling the setup time of the register 1306 larger by the multiplexor's delay. Any circuit limitations of the arbiters 1202a and 1202b, such as the finite arbitration window, may also be accounted for in the master window 1102.

If the strobe for the currently active slave was in the danger window then the data is delayed through a delay element 1304 to avoid the danger window. The delay through the delay element 1304 should be larger than the sums of the master window 1102 and the slave window 1110 but small enough to not retime the data a full cycle and back into another danger window. Because the sum of the master window 1102 and the slave window 1110 is likely a fraction of a clock period, calculating the delay should not require much accuracy. If more accuracy is desired, however, it can be obtained by using more bits of calibration. Using more bits of calibration can provide more information about where the data lies in relation to the danger window and therefore more information on how to accurately avoid the danger window. Delay element 1304 may include both calibrated and uncalibrated components.

Figure 12:
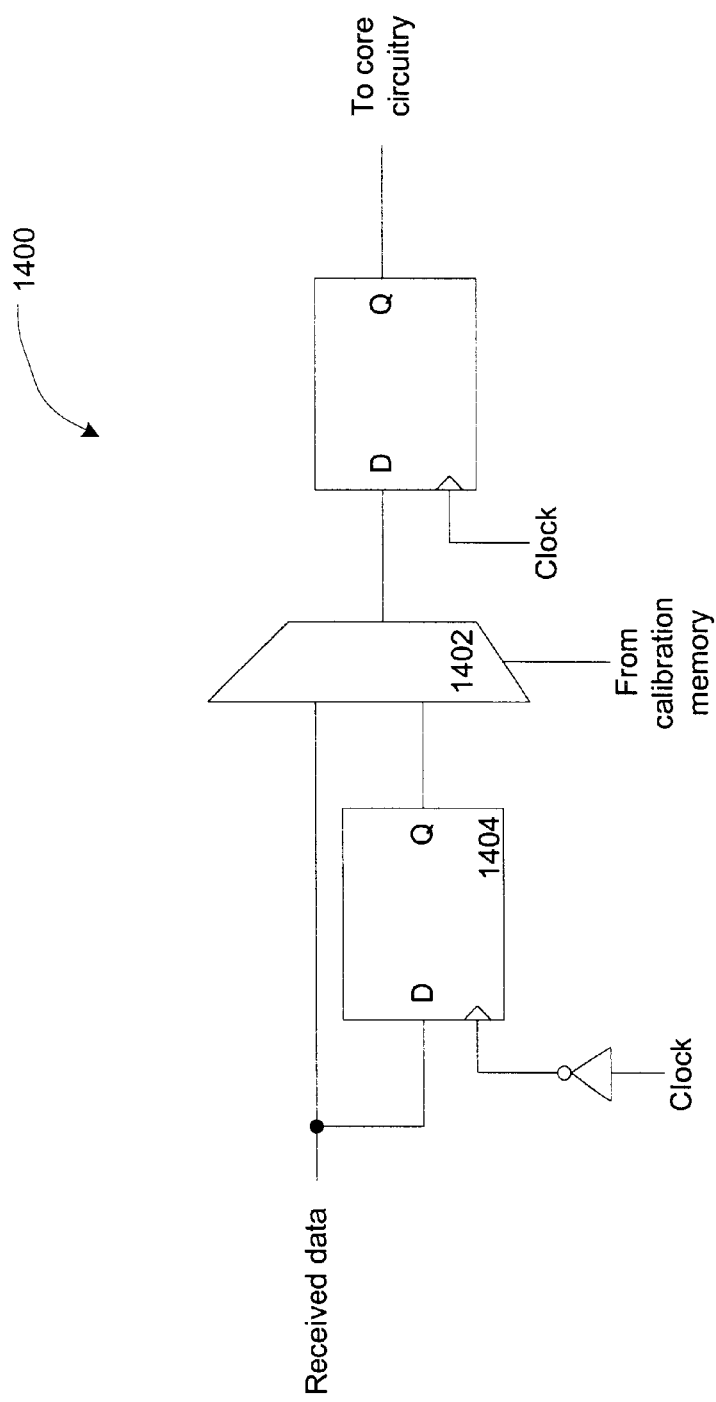

FIG. 12 shows another example of a data synchronization block, a second compensation circuit 1400. In the second compensation circuit 1400, the delay to a multiplexor 1402 is implemented as a resampling of the data on the negative edge of the system clock through a register 1404 (e.g., a DQ flip-flop). If the clock has a duty ratio in some middle range (perhaps near 50%), then the delay through the register 1404 retimes the data by about half of the clock period or some fraction neither very small nor large, which in many cases will be larger than the sum of the master window 1102 and a slave window 1110 as well as not too long of a delay. If these conditions are met, the second compensation circuit 1400 may be a very efficient, low area implementation.

Calibrating for bus return time is not limited to implementation in a multi-drop bus scenario as described above. Any system or circuitry having a device or mechanism receiving data from multiple mechanisms or devices across links with varying delays may be calibrated according to circuits such as the measurement circuit 1200 and the compensation circuit 1300 or 1400.

There has thus been disclosed a mechanism for calibrating return time, such as in the context of high bandwidth communications in multi-drop bus systems.

Other embodiments are within the scope of the following claims.

What is claimed is:
1. A method comprising:
   determining clock calibration information based on clock signals local to a master device and return clock signals corresponding to each of at least two slave devices;
   storing clock calibration information with respect to each of the slave devices with which the master device will communicate using a bus;

after the clock calibration information has been stored, resynchronizing data signals that are received from each of the slave devices based on the corresponding stored clock calibration information, the data signals received from different slave devices in an arbitrary order; and separately demodulating the received data signals before they are resynchronized.

2. The method of claim 1 further comprising demodulating the received data signals without reference to predetermined clock calibration information.

3. The method of claim 1 further comprising demodulating the received data signals in the clock domain of the received data signals.

4. The method of claim 1 in which demodulating the received data signals comprises demodulating using delay matched circuitry.

5. The method of claim 1 further comprising performing the demodulation with an accuracy that is greater than the accuracy with which the demodulated data signals are resynchronized.

6. The method of claim 1 in which the accuracy of the resynchronization is sufficient to avoid setup and hold violations in circuitry to which the demodulated data signals are delivered.

7. The method of claim 1 further comprising performing the resynchronization without feedback active after the clock calibration information has been stored.

8. The method of claim 1 in which the resynchronization of demodulated data signals consists of either passing each of the demodulated data signals with a first fixed delay amount or a second fixed delay amount.

9. The method of claim 8 further comprising deriving the first fixed delay amount from edges of a clock to which the demodulated data signals are being resynchronized.

10. The method of claim 1 in which the stored calibration information comprises digital information.

11. The method of claim 10 in which the stored calibration information comprises a single bit for each of the slave devices.

12. The method of claim 10 in which the stored calibration information comprises multiple bits for each of the slave devices.

13. The method of claim 1 further comprising determining the calibration information by determining whether a first window corresponding to the local clock signals overlaps a second window corresponding to the return clock signals, with the second window representing a possible range of timings of when data corresponding to a given return clock signal may be in transition, and the first window representing a possible range of timings during which sampling the data may be unreliable.

* * * * *